United States Patent [19]

Hunkeler et al.

[11] Patent Number: 4,868,027

[45] Date of Patent: Sep. 19, 1989

[54] COMPOSITE LABEL FOR FASTENING TO AN ARTICLE

[75] Inventors: Franz Hunkeler, Zofingen; Max Rey, Schiznach-Dorf; Renate Wunder, Basel, all of Switzerland

[73] Assignee: Jos. Hunkeler Ltd., Wikon, Switzerland

[21] Appl. No.: 106,251

[22] Filed: Oct. 7, 1987

[30] Foreign Application Priority Data

Oct. 8, 1986 [CH] Switzerland ........................ 04023/86

[51] Int. Cl.[4] ............................ B32B 7/06; B32B 7/12

[52] U.S. Cl. ......................................... 428/42; 428/43; 428/76; 40/630; 40/638; 206/610; 206/618; 283/81; 283/103; 283/105

[58] Field of Search ............... 428/42, 43, 76; 40/638, 40/306, 310, 630; 283/103, 105, 106, 81; 206/610, 618

[56] References Cited

U.S. PATENT DOCUMENTS 3,215,337 11/1965 Rosenthal ........................ 206/618 X
3,900,219 8/1975 D'Amato et al. ............... 283/105 X
4,323,608 4/1982 Denny et al. .
4,586,611 5/1986 Scalzo ................................ 206/610

FOREIGN PATENT DOCUMENTS 2345675 3/1975 Fed. Rep. of Germany .
225376 7/1943 Switzerland .

OTHER PUBLICATIONS

PCT Application WO 86/04551, publication date, 8/1986.
European Patent Application 157,484, publication Date 10/1985.

*Primary Examiner*—Alexander S. Thomas
*Attorney, Agent, or Firm*—Davis, Hoxie Faithful & Hapgood

[57] ABSTRACT

A composite label affixable to a surface of an article comprising an adhesive-bearing base sheet for affixing the label to the article, a front sheet joined to the base sheet along its periphery and an enclosure placed in the pocket formed between the base and front sheets, wherein a tear line in the front sheet provides access to said pocket and to said enclosure; also, a carrier strip having such labels mounted thereon; also a labelled article having adhesively affixed thereto a composite label comprising a base sheet, a front sheet joined to the base sheet along its periphery and an enclosure placed in the pocket formed between the base and front sheets, wherein a tear line in the front sheet provides access to said pocket and to said enclosure.

25 Claims, 1 Drawing Sheet

COMPOSITE LABEL FOR FASTENING TO AN ARTICLE

Figure 1:
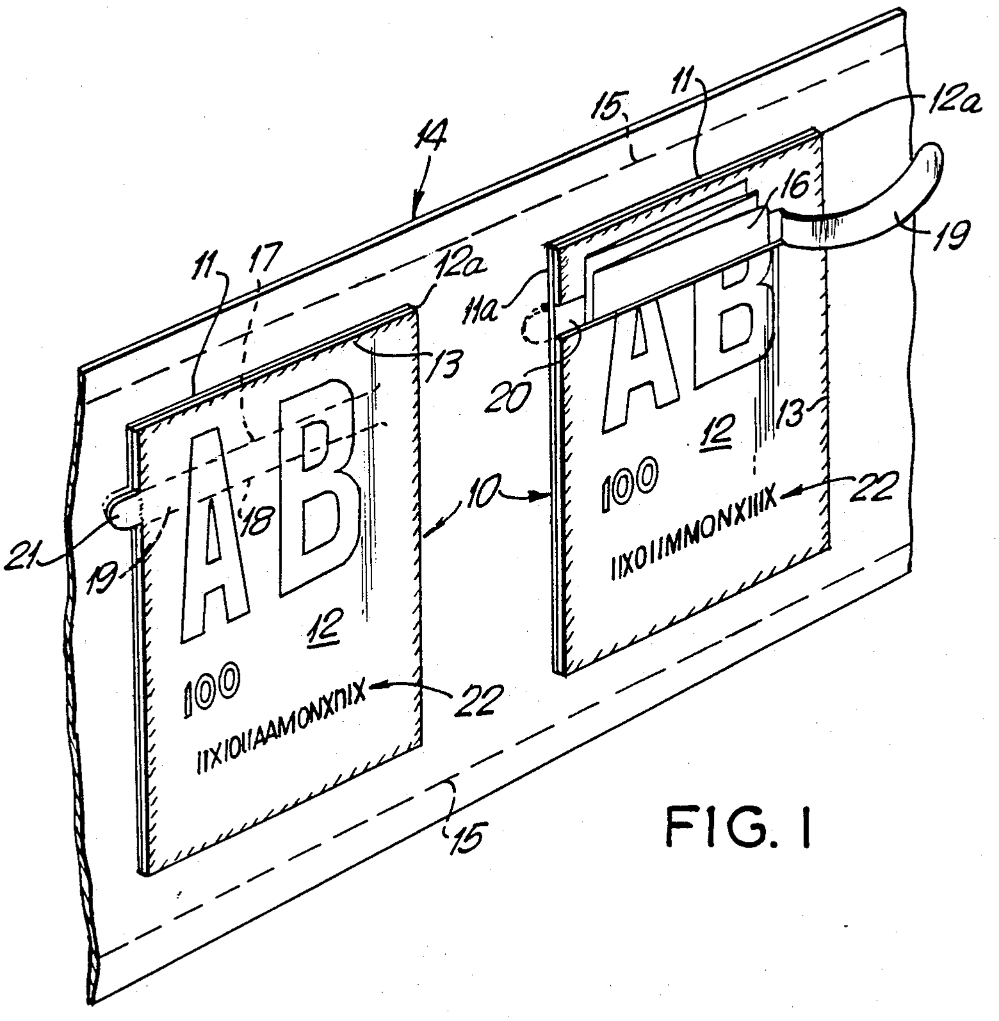

The invention relates to a composite label containing an enclosure for fastening to an article, especially to a container.

Such labels are preferably used on containers (bottles, cans or canisters), especially on those for chemical products, such as plant protection products and the like.

These labels serve not only for designating the product and its quantity in the container and possibly to indicate the manufacturer of the product, but also to some extent as a wrapping for an enclosure which usually comprises instructions for the use of the product and which gives information on the dosage, indications and contra-indications and on other legally prescribed particulars relating to the product.

However, such composite labels can also be used as address labels for the despatch of mutually identical articles to a multiplicity of different addresses, in which case the enclosure can comprise, for example, a delivery note and/or an invoice.

Such composite labels substantially simplify the preparatory work necessary for dispatch or sale to the ultimate consumers.

A composite label is known, for example, from U.S. Pat. No. 4,323,608. In this label, the rectangular base sheet equipped on one side with a pressure-sensitive adhesive is glued to the cover sheet along two opposite edges. The cover sheet has a tearing line along one of these edges. When this tearing line is severed, the cover sheet can be lifted off from the basic sheet and turned down like the page of a book. The enclosure is made in one piece with the cover sheet and is applied under it in zig-zag folds, so that, after the tearing line has been severed, the enclosure can be folded out.

In a further composite label which has become public, the enclosure comprises a thin stitched pamphlet, wherein a sheet of the label forms a cover sheet of the pamphlet.

Since, in these known composite labels, the cover sheet is glued to the base sheet only along two opposite sides, there are gaps between the base sheet and the cover sheet which are exposed to external influences, such as, for example, dust or water splashes, even when the tearing line has not yet been severed. There is also no guarantee that, during the stacking, transportation or general handling of articles having the known composite labels, their tearing line in a cover sheet will not be servered unintentionally and the enclosure then damaged, for example crumpled. Once the tearing line in the known composite label has been severed, the enclosure, which cannot be removed without being torn off, is exposed to the above-mentioned external influences to an even greater extent and can no longer be folded in again.

European Preliminary Publication No. 0,157,484 makes known a label which can accommodate an enclosure, which is designed in a similar way to a letter envelope. The enclosure is accommodated in a pocket which is formed by a rectangular front part, two side flaps and a bottom flap. The side flaps and the bottom flap are in one piece with the front part and are folded round inwards against the back of the latter. Opposite the bottom flap, a cover flap is attached to the front part and is joined to the front part by means of a tearing line.

The label, with the enclosure inserted in the pocket, is glued to a container or a carrier film by means of its back, that is to say the bent-back side flaps and bottom flaps and the rear face of the cover flap. In order to extract the enclosure from the pocket, the tearing line is severed.

This label involves a certain outlay in production terms and requires careful glueing along a closed bonding region, so that the enclosure is effectively protected in the pocket against the action of external influences. Such glueing is made rather more difficult by the unevenness on the back of the label, this being caused by the over-lapping side flaps and bottom flaps.

The object of the present invention is to provide a composite label containing an enclosure for fastening to an article, in which, whilst ensuring a simple design, substantial protection of the enclosure is guaranteed as long as the latter is not needed, and which also makes it possible to handle the enclosure in a simple way.

This object is achieved by the label of this invention, which comprises a base sheet to be fastened to an article, preferably to a container, by means of its rear face and a cover sheet fastened to the base sheet and covering its front face, those sheets defining an enclosure which is accessible by severing a tear line in the cover sheet. The cover sheet is joined to the base sheet along its entire periphery. The tear line, which may be a tear strip, determines a slit through which, when the tear line is severed, an enclosure inserted loosely between the base and cover sheets can be extracted and reinserted.

The base and cover sheets connected to one another along the entire periphery form a closed-off pocket, in which the enclosure is fully protected and accommodated so as to be encased against the outside. The enclosure can be extracted through the pocket orifice formed as a result of the severing of the tearing line, but can also be put back into the pocket again. The composite label is comparatively simple to produce. The pocket is already closed at the stage of production of the composite label and not only when the label is attached to an article, so that if the composite label is possibly glued on carelessly this cannot have an adverse effect on the protection of the enclosure.

Figure 2:
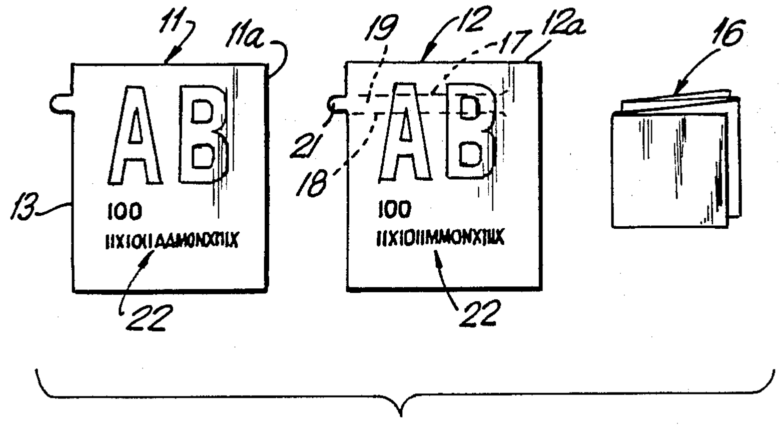

The invention is described in detail below, purely by way of example, with reference to the drawings. In the drawings:

FIG. 1 shows a diagrammatic representation of two composite labels according to the invention, fastened to a carrier strip for a labelling machine, the label shown on the right being opened and the enclosure slip contained in it being pulled out to some extent, and FIG. 2 shows a plan view of the three main components of the composite label.

As regards FIG. 1, it should be pointed out, as a preliminary, that the thickness of the components of the label is shown greatly exaggerated for the sake of clearer illustration.

The composite labels 10 shown in FIG. 1 consist of a base sheet 11 and of a cover sheet 12. The cover sheet 12 virtually coincides with the base sheet 11 and is joined to this along the entire periphery, for example by means of adhesive bonding or heat sealing. In FIG. 1 and FIG. 2, the joined region is indicated by the hatching 13. The base sheet 11, on its rear face, the back 11*a* facing away from the observer, carries, for example, a pressure-sensitive adhesive, by means of which, in this case, the labels 10 adhere, at a predetermined distance from one another, to a carrier strip 14 impregnated with a separating agent. The carrier strip 14 can have an edge perforation indicated by the broken lines 15, making it possible to feed the labels 10 to a labelling machine (not shown), where they are peeled off from the carrier strip 14 and glued to the article to be labelled.

Since, as mentioned, the cover sheet 12 is joined to the base sheet 11 along its entire periphery, between these sheets there is a gap closed off, as in a closed letter envelope. An enclosure, here a folded enclosure slip 16, is inserted virtually loosely into this gap.

In the embodiment shown in FIG. 1, composite label 10 is rectangular in shape. Edge 12*a* is the shorter side of the rectangle. In the cover sheet 12 there are, near its upper edge 12*a*, two tearing lines 17, 18 which extend parallel to one another and are formed, for example, by a fine perforation or by two laminated-in threads and which enclose a tear-open tab 19 between them. This ends in a tongue 21 which projects beyond the contour of the label 10.

As shown on the right in FIG. 1, when the tear-open tab 19 is grasped by its tongue 21 and the tearing lines 17, 18 are consequently severed, a slit 20 is made in the cover sheet 12, and the enclosure slip 16 can be extracted and also reinserted through this slit 20.

The tearing lines 17, 18 can also extend over the entire width of the cover sheet 12, so that, when they are severed, the tear-open tab 19 can be removed completely.

The cover sheet 12 carries an imprint which serves for identifying the article to be equipped with the label 10. In the present example, A, B denote a product name, the number 100 denotes the quantity and the further writing zone 22 gives other particulars.

Preferably, the base sheet 11 also carries, on its front face, the side facing the cover sheet 12, an imprint corresponding to the imprint on the cover sheet 12, especially coinciding with this, as shown on the left in FIG. 2. Thus, the information contained on the label 10 remains intact even when the tab 19 has been removed.

Both the base sheet 11 and the cover sheet 12 are preferably made of a waterproof material, such as, for example, a heat-sealable paper having wet tearing strength, or of a printable plastic film. It has been shown that the label 10, in its state appearing on the left in FIG. 1, offers complete protection for the enclosure slip 16, and that unintentional severing along the tearing lines 17, 18 scarcely ever occurs, even though the tongue 21 can be a place where something may possibly be caught.

We claim:

1. A composite label affixable to a surface of an article, comprising:

a. a base sheet having a front face and a rear face, said rear face bearing an adhesive coating for affixing said composite label to the surface of the article;

b. a cover sheet including a border region extending entirely around its periphery, said cover sheet covering the front face of said base sheet and being joined thereto along said entire border region to form an enclosed space between said sheets;

c. a separate enclosure removably located within said enclosed space; and d. in said cover sheet at least one tear line which, when torn, creates an opening which provides access to said enclosed space for removal and replacement of said enclosure.

2. A composite label according to claim 1 wherein said tear line comprises a laminated-in thread.

3. A composite label according to claim 1 wherein said base sheet and said cover sheet are made of waterproof material.

4. A composite label according to claim 3 wherein said base sheet and said cover sheet are made of heat-sealable paper having wet tearing strength.

5. For use in a labelling machine, a paper carrier strip impregnated with a separating agent and having deposited thereon a multiplicity of composite labels according to claim 4.

6. A composite label according to claim 3 wherein said base sheet and said cover sheet are made of printable plastic film.

7. For use in a labelling machine, a paper carrier strip impregnated with a separating agent and having deposited thereon a multiplicity of composite labels according to claim 3.

8. A composite label according to claim 1 wherein said at least one tear line comprises a tear strip formed by perforations in the cover sheet.

9. A composite label according to claim 8 further comprising a grippable tab integral to an end of said tear strip and projecting beyond the border region of said cover sheet.

10. A composite label according to claim 8 wherein said base sheet and said cover sheet are made of waterproof material.

11. A composite label according to claim 8 wherein said composite label is at least approximately rectangular in shape and wherein said tear strip at least approximately parallels one edge of said label in relative proximity to said edge.

12. A composite label according to claim 11 wherein said composite label has two shorter edges and two longer edges and wherein said tear strip is proximate one of said shorter edges.

13. For use in a labelling machine, a paper carrier strip impregnated with a separating agent and having deposited thereon a multiplicity of composite labels according to claim 8.

14. A composite label according to claim 1 wherein said composite label is at least approximately rectangular in shape and wherein said at least one tear line at least approximately parallels one edge of said label in relative proximity to said edge.

15. For use in a labelling machine, a paper carrier strip impregnated with a separating agent and having deposited thereon a multiplicity of composite labels according to claim 1.

16. A composite label according to claim 1, wherein said cover sheet and said base sheet are virtually the same size.

17. A composite label at least approximately rectangular in shape and affixable to a surface of an article, comprising:

a. a base sheet having a front face and a rear face bearing an adhesive coating for affixing said composite label to said the surface of the article;

b. a cover sheet including a border region extending entirely around its periphery, said cover sheet covering the front face of said bse sheet and being joined thereto along said entire border region to form an enclosed space between said sheets;

c. a separate enclosure removably located within said enclosed space;

d. in said cover sheet, relatively proximate and relatively parallel to an edge thereof, a tear strip formed by two lines of perforations; and e. a grippable tab integral to an end of said tear strip and projecting beyond the border region of said cover sheet, whereby tearing of said tear strip produces in said cover sheet an opening which provides access to said enclosed space for removal and replacement of said enclosure.

18. A composite label according to claim 17 wherein said base sheet and said cover sheet are made of a waterproof material.

19. For use in a labelling machine, a paper carrier strip impregnated with a separating agent and having deposited thereon a multiplicity of composite labels according to claim 17.

20. A composite label according to claim 17, wherein said cover sheet and said base sheet are virtually the same size.

21. A labelled article comprising:

a. an article having an external surface;

b. a composite label mounted on said surface, said composite label comprising, (i) a base sheet having a front face and a rear face, (ii) a cover sheet including a border region extending entirely around its periphery, said cover sheet covering the front face of said base sheet and joined thereto along said entire border region to form an enclosed space between said sheets, (iii) a separate enclosure removably located within said enclosed space, and (iv) in said cover sheet at least one tear line which, when torn, produces an opening which provides access to said enclosed space for removal and replacement of said enclosure; and c. an adhesive layer between the rear face of said base sheet and said external surface affixing said composite label to said surface.

22. A labelled article according to claim 21 wherein said base sheet and said cover sheet are made of waterproof material.

23. A labelled article according to claim 21 wherein said at least one tear line comprises a tear strip formed by perforations in the cover sheet.

24. A labelled article according to claim 23 further comprising a grippable tab integral to an end of said tear strip and projecting beyond the border region of said cover sheet.

25. A labelled article according to claim 21, wherein said cover sheet and said base sheet are virtually the same size.

* * * * *